(12) United States Patent
Pedersen

(10) Patent No.: US 7,734,675 B1
(45) Date of Patent: Jun. 8, 2010

(54) SYSTEM AND METHOD FOR GENERATING A BINARY RESULT IN A DATA PROCESSING ENVIRONMENT

(75) Inventor: Mark E. Pedersen, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 957 days.

(21) Appl. No.: 10/313,493

(22) Filed: Dec. 5, 2002

(51) Int. Cl.
*G06F 7/50* (2006.01)
(52) U.S. Cl. .................................... 708/706
(58) Field of Classification Search .......... 708/700–714
See application file for complete search history.

(56) References Cited

U.S. PATENT DOCUMENTS

| | | | |
|---|---|---|---|
| 4,623,982 A * | 11/1986 | Ware ........................ | 708/714 |
| 5,043,934 A | 8/1991 | Lamb | |
| 5,235,539 A | 8/1993 | Patel | |
| 5,276,635 A * | 1/1994 | Naini et al. ................. | 708/713 |
| 5,493,525 A * | 2/1996 | Yang et al. .................. | 708/714 |
| 5,499,203 A * | 3/1996 | Grundland ................... | 708/710 |
| 5,619,442 A | 4/1997 | Opris | |
| 5,668,749 A * | 9/1997 | Corleto et al. .............. | 708/490 |
| 5,732,008 A * | 3/1998 | Abu-Khater et al. ......... | 708/714 |
| 5,838,602 A * | 11/1998 | Feiller et al. ................ | 708/714 |
| 5,896,308 A | 4/1999 | Gonfaus et al. | |
| 5,978,827 A * | 11/1999 | Ichikawa .................... | 708/709 |
| 6,480,875 B1 | 11/2002 | Miyoshi et al. | |
| 2002/0143841 A1 * | 10/2002 | Farooqui et al. ............ | 708/714 |
| 2003/0065700 A1 * | 4/2003 | Mathew et al. .............. | 708/714 |

* cited by examiner

*Primary Examiner*—Chat C Do
(74) *Attorney, Agent, or Firm*—Baker Botts L.L.P.

(57) ABSTRACT

A method for processing data includes generating one or more binary results based on one or more inputs and receiving one or more of the binary results. One or more conditional carryout signals may then be generated based on one or more of the binary results. The method also includes communicating one or more of the conditional carryout signals via one or more propagate cells. One or more carryout signals may be generated and received. A sum may then be generated based on the received carryout signals, the sum being communicated to a next destination.

10 Claims, 4 Drawing Sheets

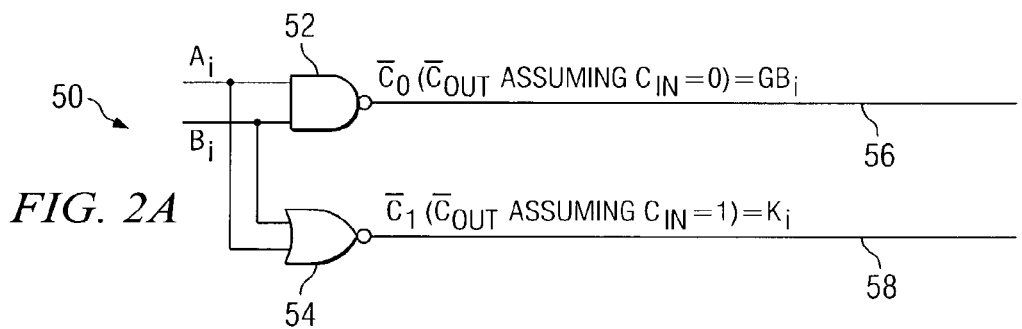
FIG. 2A
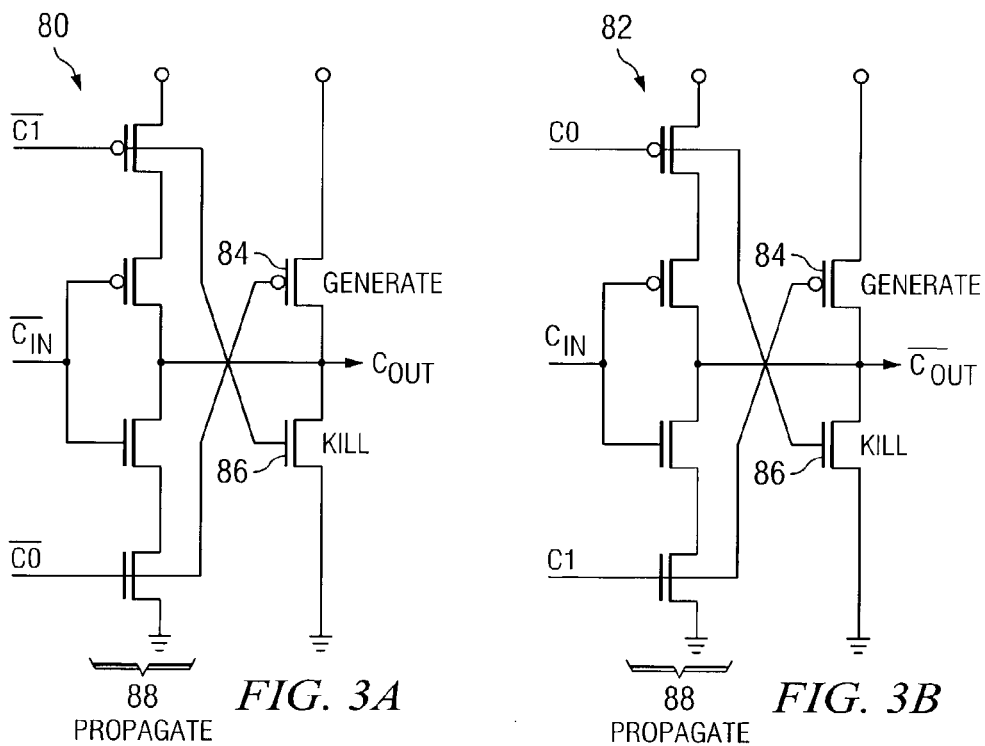
FIG. 2B
FIG. 3A
FIG. 3B

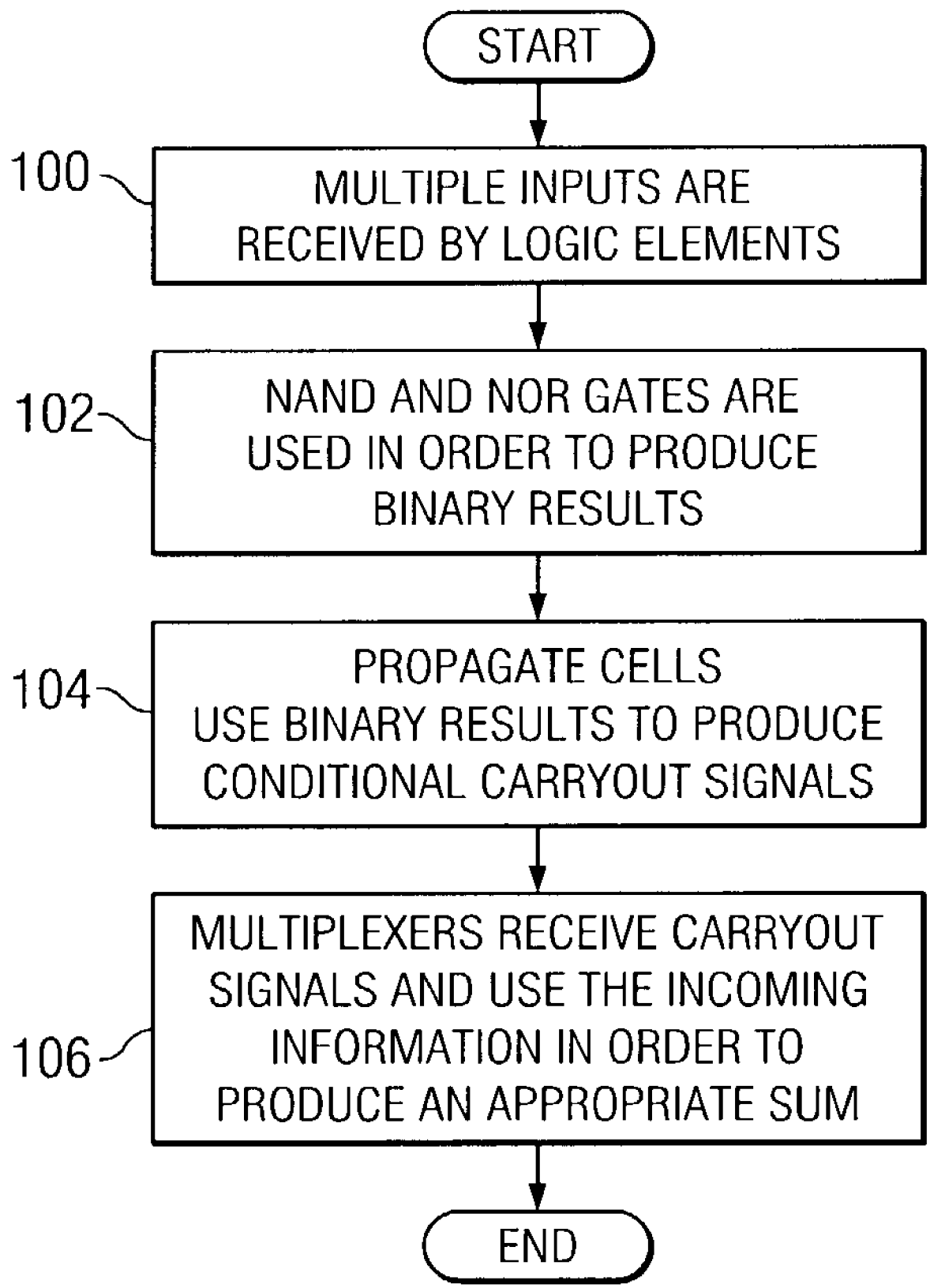

US 7,734,675 B1

SYSTEM AND METHOD FOR GENERATING A BINARY RESULT IN A DATA PROCESSING ENVIRONMENT

TECHNICAL FIELD OF THE INVENTION

This invention relates in general to the field of data processing and more particularly to a system and method for generating a binary result in a data processing environment.

BACKGROUND OF THE INVENTION

Data processing architectures have grown increasingly complex in data communication and data processing systems. Some data processing systems may include one or more pieces of logic that are configured to provide some result or to produce a selected output for a designated input. When arranged properly, these logic elements and components provide valuable tools for data processing systems that seek to generate a result quickly and accurately based on incoming information or data.

One drawback associated with some data processing architectures is that they suffer from slow processing speeds. This is often caused by a deficiency in one or more objects that cause components or logic elements to stagnate while waiting for a resultant value to be received before proceeding to a next step in a processing operation. This delay may inhibit system performance as logic elements are forced to wait for results before being able to execute their respective tasks.

In attempting to address issues relating to speed, it is critical that space allocations for a corresponding integrated circuit are not sacrificed. Positioning a series of components or elements in a data processing system that address speed, but that occupy an excessive amount of integrated circuit space, does not provide a feasible solution. Thus, the ability to provide a fast and accurate data processing system while simultaneously minimizing space allocation for an integrated circuit, provides a significant challenge to designers and manufacturers associated with data processing systems.

SUMMARY OF THE INVENTION

From the foregoing, it may be appreciated by those skilled in the art that a need has arisen for an improved approach for optimizing one or more parameters associated with a data processing system. In accordance with one embodiment of the present invention, a system and method for producing a sum in a data processing system are provided that substantially eliminate or greatly reduce disadvantages and problems associated with conventional data processing techniques.

According to one embodiment of the present invention, there is provided a method for processing data that includes generating one or more binary results based on one or more inputs and receiving one or more of the binary results. One or more conditional carryout signals may then be generated based on one or more of the binary results. The method also includes communicating one or more of the conditional carryout signals via one or more propagate cells. One or more carryout signals may then be generated and received. A sum may then be generated based on the received carryout signals, the sum being communicated to a next destination.

Certain embodiments of the present invention may provide a number of technical advantages. For example, according to one embodiment of the present invention, an approach for processing data in order to produce a binary result is provided that offers enhanced processing speeds. The enhanced processing speeds are a result of the replacement of a multiplexer that would otherwise be positioned at each section in the data processing architecture. The configuration proffered in accordance with the teachings of the present invention allows a carryout value to be communicated consistently and systematically to a next destination without requiring one or more logic elements to wait for a resultant signal to be delivered by a multiplexer.

Another technical advantage associated with one embodiment of the present invention is a result of the replacement of a plurality of multiplexers with propagate cells. Their replacement results in smaller components that occupy less space on an integrated circuit. This provides an opportunity for an associated architecture to be minimized or for the vacant space to be utilized by additional components. In addition, the elimination of multiple multiplexers may reduce costs and expenses associated with a corresponding architecture. A single multiplexer may be suitably implemented per segment of the data processing architecture. For example, thirty-two logic elements may be implemented in order to produce two binary results that are received by a set of multiplexers to produce a binary sum. Additionally, the elimination of the multiplexers does not deteriorate system performance or system accuracy. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 2A is a logic diagram of an element included within the data processing system;

FIG. 2B is a truth table corresponding to the logic diagram;

FIG. 3A is a schematic diagram of an example propagate cell included within the data processing system;

FIG. 3B is a schematic diagram of the propagate cell; and

FIG. 4 is a flowchart illustrating a series of example steps associated with a method for producing a binary result in the data processing system.

DETAILED DESCRIPTION OF THE INVENTION

Figure 1A:
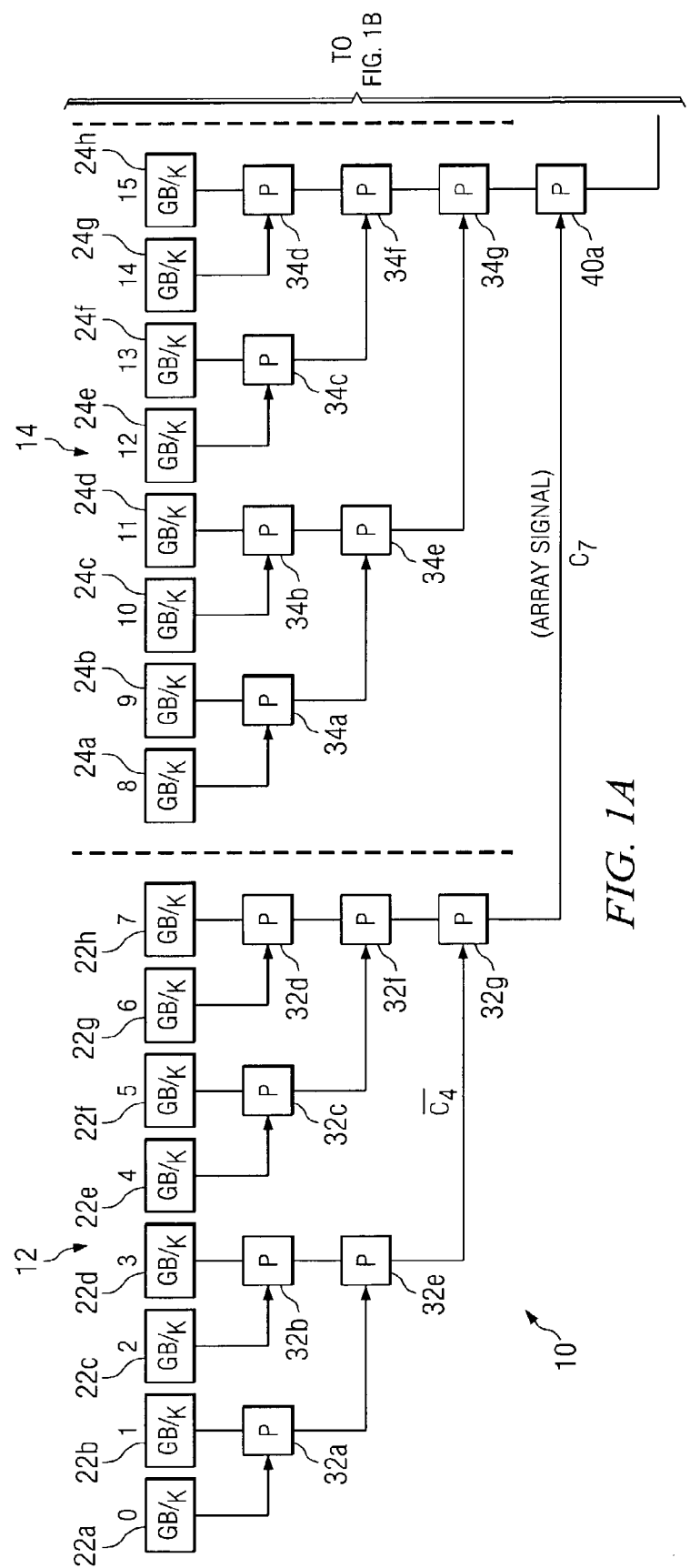
FIGS. 1A-1B are block diagrams of a data processing system in accordance with one embodiment of the present invention.
Figure 1B:
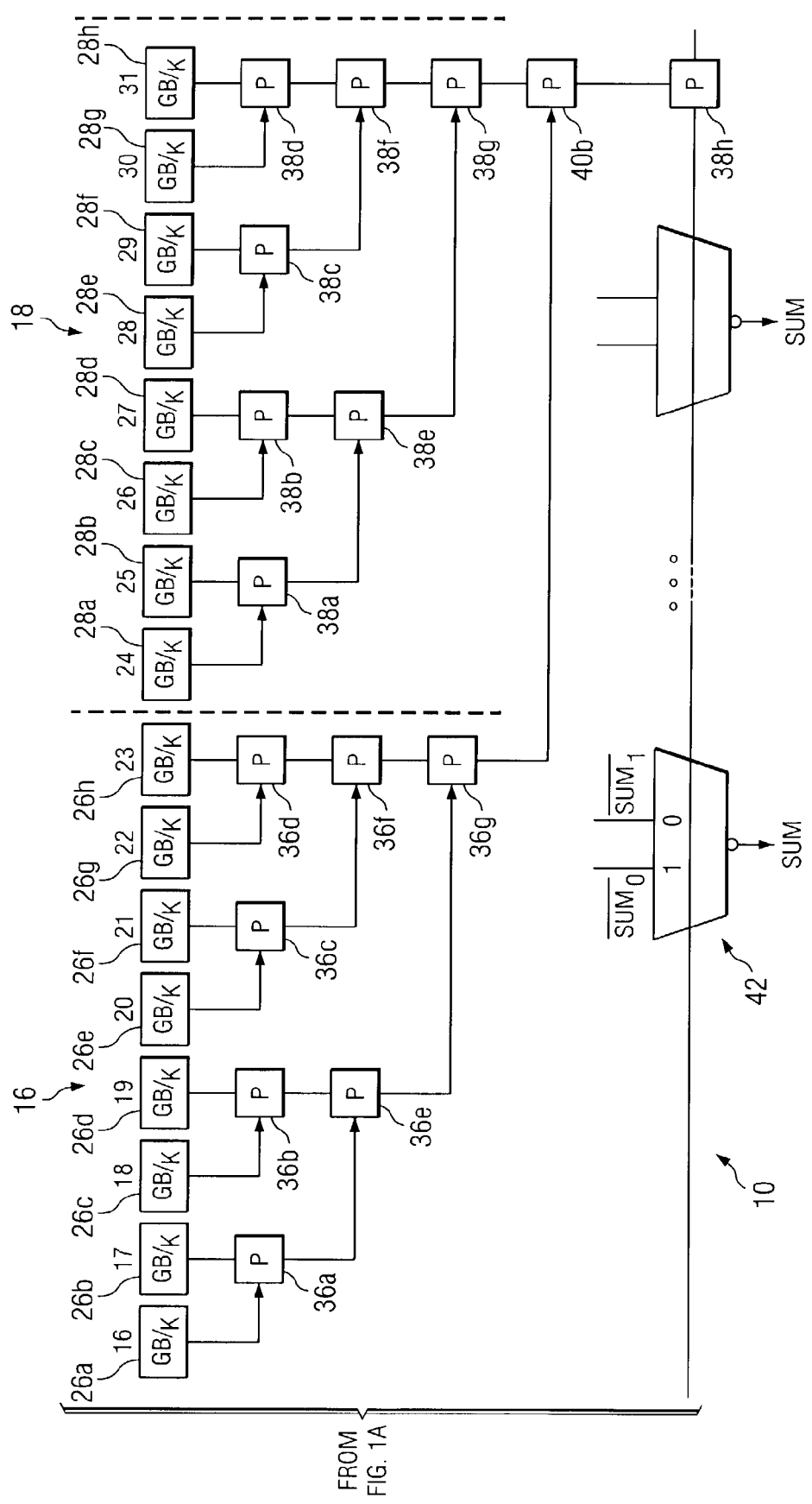

FIGS. 1A and 1B are block diagrams of a data processing system 10 in accordance with one embodiment of the present invention. Data processing system 10 may be positioned in any suitable location within or external to a microprocessor, a processor, a field programmable gate array (FGA), an erasable programmable read-only memory (EPROM), an electrically erasable read-only memory (EEPROM), or any other suitable data processing element, component, element, or object. In addition, data processing system 10 may be positioned in any suitable data processing application that is operable to facilitate the delivery, transmission, switching, or generation of information or data in a binary environment.

Data processing system 10 includes four sections 12, 14, 16, and 18 that execute parallel processing for incoming information. Each of the parallel processing sections 12, 14, 16, and 18 include multiple logic elements 22a-h, 24a-h, 26a-h and 28a-h, respectively. In addition, each of the parallel processing sections 12, 14, 16, and 18 include multiple propagate cells 32a-g, 34a-g, 36a-g, and 38a-h respectively. Data processing system 10 also includes a set of multiplexers 42 operable to receive a carryout signal from a selected propagate cell 40a and to generate an appropriate sum based on the received information.

In accordance with the teachings of the present invention, data processing system 10 operates to provide an architecture capable of receiving multiple inputs and quickly processing the input information or signals in order to produce a resultant sum. Data processing system 10 accomplishes this by replacing additional multiplexers at each parallel processing section 12, 14, 16, and 18 with corresponding propagate cells. The architecture, as illustrated in FIGS. 1A-1B, provides the ability to produce multiple binary results in parallel by using computational logic and to further utilize those binary results as carry-in values. The carry-in values are received at propagate cells 32a-g, 34a-g, 36a-g, and 38a-h and are thereafter compared or evaluated at subsequent points in data processing phases in order to provide suitable carryout signals.

The carryout signals may then be employed at subsequent phases of the processing operations for each parallel processing section 12, 14, 16, and 18. A propagate cell may be used in order to generate carryout signals that are based on conditional carryout signals and that are to be communicated to multiplexers 42. The resultant values may be processed, compared, or otherwise utilized by propagate cells 32a-g, 34a-g, 36a-g, and 38a-h and converge at multiplexers 42 via propagate cell 40a. Multiplexers 42 may receive information from propagate cell 40a and generate a sum based on this value. The sum reflects one or more inputs received at each of sections 12, 14, 16, and 18.

Data processing system 10 provides a data processing approach that offers enhanced processing speeds as a result of the replacement of multiple multiplexers that would otherwise be positioned at each section in the data processing architecture. Accordingly, a carryout value may be communicated consistently and systematically to a next destination without requiring one or more logic elements to await a resultant signal to be delivered by a multiplexer. Such a configuration increases processing speeds and reduces delay times caused by components that rely on incoming information to execute their assigned tasks.

Additionally, the elimination of multiple multiplexers or multiple phases of multiplexing simplifies a corresponding data processing architecture, which also results in fewer components occupying significant space on an integrated circuit. This further provides an opportunity for an associated architecture to be minimized or for the vacant space to be utilized by additional components. In addition, the replacement of multiple multiplexers reduces costs and expenses associated with a corresponding architecture. Only a single set of multiplexers may be implemented per segment of data processing system 10. In the example illustrated in FIGS. 1A-1B, thirty-two logic elements may be implemented in order to produce results that are received by multiplexers 42 and then summed properly. The elimination of excess multiplexers in data processing system 10 does not affect system performance or system accuracy.

In the example embodiment illustrated in FIGS. 1A-1B, data processing system 10 is a four-section 32-bit element. Alternatively, data processing system 10 may be any other suitable size or divided into any number of appropriate segments in accordance with particular needs. For example, data processing system 10 may be a four, an eight, a sixteen, or a sixty-four bit element divided into two or more segments where appropriate.

Each of sections 12, 14, 16, and 18 include similar components that operate in substantially the same manner. For purposes of example and teaching, a description of section 12 is offered. Section 12 includes multiple logic elements 22a-h. Each of logic elements 22a-h may receive multiple inputs from any suitable destination and invoke the logic included in each of logic elements 22a-h in order to generate a binary result. Each of logic elements 22a-h are coupled to respective propagate cells 32a-d. For example, the resultant produced by logic gates 22a and 22b is communicated to propagate cell 32a. Similarly, the binary resultant produced by logic elements 22c and 22d is communicated to propagate cell 32b. Additional details relating to the logic elements included in each of sections 12, 14, 16, and 18 are provided below with reference to FIGS. 2A-B.

In a 32-bit configuration as illustrated in FIGS. 1A-1B, there are generally six sub-sections of processing to be executed in order to produce a final resultant. In the first section, generate and kill terms may be generated and this generation may be accomplished through NAND and NOR gates. Two sets of carry signals may then propagate to a selected next point. When the final computed carry values are received, the output is multiplexed. Multiplexers 42 are thus used for proper summation protocols. The horizontal line illustrated in FIGS. 1A-1B reflects a coupling between one or more multiplexers 42. The horizontal line may operate as a select for multiplexers 42. The input to multiplexers 42 may come from suitable logic which generates the input.

In a first section of data processing system 10, logic element 22a may include a single NAND gate as there is no carry-in signal being provided. The NAND gate may generally produce a generate-bar signal while the NOR gate produces the kill. Additionally, generate-bar is equal to carryout-bar when the carry-in equals zero. Conversely, assuming a carry-in of one, kill is equal to carryout-bar. The carry-in value is delivered by the propagate cell and thus two operands are delivered by propagate cells 40a and 40b with one value being propagated out after being multiplexed by multiplexers 42.

FIG. 2A is a logic diagram 50 illustrating an example of potential logic to be included in each of logic elements 22a-h, 24a-h, 26a-h, and 28a-h. Logic diagram 50 includes a NAND gate 52 and a NOR gate 54. In addition, the example provided in FIG. 2A includes two inputs, $A_i$ and $B_i$, that represent inputs to a given logic element. Logic diagram 50 also includes a generate-bar output 56 and a kill output 58 produced by NAND gate 52 and NOR gate 54 respectively. Inputs $A_i$ and $B_i$ are used to produce generate-bar output 56 and kill output 58. Subsequently, these output values are used in conjunction with a carry-in value ($C_{in_1}$) in order to generate a carryout value ($C_{out_1}$).

FIG. 2B is a truth table 60 corresponding to logic diagram 50 of FIG. 2A. Truth table 60 offers a series of example protocol conditions: kill 64, propagate 66, and generate 68. These conditions are produced as a result of the values of generate-bar output 56 and kill output 58. Generate-bar output 56 and kill output 58 are based on input values $A_i$ and $B_i$ that are compared in conjunction with a carry-in value as reflected in truth table 60. It is important to note that, as reflected in truth table 60, the combination of generate-bar equal to zero and kill equal to one cannot occur. Moreover, it is impossible to obtain an illegal state, i.e. killing and generating a carryout at the same time. For example, it is illogical to have a generate equal to one and a kill equal to one at the same time. Thus, data processing system 10 may take advantage of potential illegal or illogical states in order to improve system speed. Accordingly, such potential combinations may be avoided entirely in order to increase processing speeds by ignoring the identified insignificant combinations.

Other combinational logic of interest reflects that a generate signal is produced when both input $A_i$ and $B_i$ are equal to one. This configuration translates into a carryout signal being produced, regardless of the value of the carry-in signal. Similarly, if both $A_i$ and $B_i$ are equal to zero, regardless of what the carry-in value is, a carryout signal will not be produced. These reflect generate and kill conditions respectively based on inputs $A_i$ and $B_i$ that are communicated to logic elements included within data processing system 10.

FIGS. 3A and 3B are schematic diagrams that illustrate example devices corresponding to one or more of the propagate cells included within data processing system 10. A set of propagate cells 80 and 82 offer one example circuit configuration of propagate cells to be included within data processing system 10. Alternatively, propagate cells 80 and 82 may be constructed or configured in any other suitable manner and include any appropriate additional elements or the removal of elements that are illustrated in FIGS. 3A and 3B. Propagate cells 80 and 82 have only been offered for purposes of teaching and illustration and should not be construed to limit various other forms or embodiments of alternative propagate cells producing similar results in accordance the operation of the present invention.

Propagate cells 80 and 82 include multiple p-MOS devices connected in series and multiple n-MOS devices that are also connected in series. FIG. 3A reflects a carry-in bar configuration that produces a carryout resultant. FIG. 3B illustrates a carry-in input that produces a carryout bar result. Each of the schematics also illustrate the location or determination of generate, kill, and propagate protocol conditions 84, 86, and 88 respectively. These conditions further detail the conditions as initially disclosed in truth table 60 of FIG. 2B.

In operation, each propagate cell 80 and 82 propagates down a carry value generated by the preceding logic. In order to take advantage of the identification of the impossibility of illegal states, propagate cells 80 and 82 may be implemented to avoid or ignore illogical combinations. Propagate cells 80 and 82 may also eliminate the need for inverters where appropriate. Propagate cells 80 and 82 may also allow components or devices driven by carry-in and carry-in bar values to be positioned nearest the output, which is inherently faster. Accordingly, $C_{in}$ may drive the element or device closest to the output for both P and N devices. This configuration further allows construction of the device to be smaller, which in turn reduces the load on a $C_{in}$ signal.

FIGS. 3A and 3B also reflect that two p-MOS devices in series produce an output of one in the condition that a kill is not present (kill equal to zero) and $C_{in}$-bar equals zero. It is also important to note that two n-channel devices coupled in series produce an output of zero in the condition that no generate signal is present (generate-bar equals one) and carry-in bar equals one. The carryout value is equal to zero if there is a kill condition. If K equals one, the propagate condition is turned off and the output is low. Also, the carryout value is equal to 1 if there is a generate condition. If generate-bar equals zero, the propagate condition is turned off and the signal is high.

In operation, data processing system 10 combines one or more features of a ripple adder, a carry look ahead adder, and a carry select adder. This amalgamation provides a minimal delay when a carry-in value is received by a logic element and thereby eliminates a multiplexer delay that would otherwise be experienced. This in turn enhances operational speeds of an associated device as logic elements are not precluded from moving to a next operational step by being forced to wait for an incoming value.

The improved speed is also based on the recognition that the two signals that are used for a carry look ahead operation are substantially similar to conditional carry signals, i.e. a carryout assuming a carry-in of one and a carryout assuming a carryout of zero. Thus, instead of having a multiplexer delay when the actual carry arrives, a propagate cell is used in place of a multiplexer. A propagate cell may be generally faster than the multiplexer and provide even more beneficial speeds by identifying the equivalents between the kill, the generate, and the conditional carry signals. Thus, various illogical potential combinations are eliminated in providing an enhanced processing platform for, data processing system 10.

FIG. 4 is a flowchart illustrating a series of example steps associated with a method for processing data. The method begins at step 100 where multiple inputs may be received by logic elements 22a-22h of section 12. The same activity is occurring concurrently at sections 14, 16, and 18. At step 102, NAND and NOR gates may be used in order to produce binary results. At step 104, the binary results are used to generate conditional carryout signals. The conditional carryout signals may reflect a protocol condition such as kill, propagate, or generate. The conditional carryout signals may be used to generate a carryout signal. The process of generating conditional carryout signals may be executed concurrently at sections 14, 16, and 18 in a parallel processing fashion. Any suitable number of propagate cells may be employed in order to facilitate any designated number of processing tasks.

Propagate cell 40a continues to communicate the resultant value to multiplexers 42. At step 106, multiplexers 42 receive the resultant (one or more carryout signals) and properly multiplex the incoming sum information in order to produce an appropriate sum. The sum may then be communicated to a subsequent adder, another component, or to any other suitable next destination for further processing. Thus, in the example illustrated, multiplexers 42 are only being used for purposes of summation.

Some of the steps illustrated in FIG. 4 may be changed or deleted where appropriate and additional steps may also be added to the flowchart. These changes may be based on specific data processing system architectures or particular communication arrangements or configurations and do not depart from the scope or the teachings of the present invention.

Although the present invention has been described in detail with reference to particular embodiments, it should be understood that various other changes, substitutions, and alterations may be made hereto without departing from the spirit and scope of the present invention. For example, although the present invention has been described with reference to a configuration that is somewhat similar to an adder circuit arrangement, any suitable type of processing component, circuit, element, or object may employ the teachings of the present invention. The data processing methods as described may be applicable to any digital integrated circuit architecture or any processing configuration that seeks to receive multiple inputs and to produce a binary result.

In addition, although FIGS. 3A and 3B illustrate an arrangement of selected elements, such as p-MOS and n-MOS devices arranged in series, numerous other components may be used in combination with these elements without departing from the teachings of the present invention. For example, elements such as amplifiers, inverters, couplers, and switches may be included or coupled to these elements where appropriate. The embodiment illustrated in FIGS. 3A and 3B have only been offered for purposes of teaching and, where appropriate, may be inclusive of various other suitable components that facilitate the processing of data or information in order to produce a binary result.

Moreover, although FIGS. 1A-1B illustrate four sections, 12, 14, 16, and 18, of a data processing environment, data processing system 10 may include any suitable number of segments positioned in any appropriate format. For example, four bit, eight bit, sixteen bit, and sixty-four bit configurations may be provided in conjunction with the present invention. Additionally, these configurations may be divided or partitioned in any suitable fashion in accordance with particular needs. Similarly, any suitable number of propagate cells may be implemented into data processing system 10 in order to effectuate selected processing operations. The embodiment illustrated in FIGS. 1A-1B has only been offered for purposes of example.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus for processing data, comprising:
a plurality of logic elements, each of the logic elements operable to generate one or more binary results based on one or more of inputs, each logic element comprising:
a NAND gate configured to generate a generate-bar output from the inputs; and
a NOR gate configured to generate a kill output from the inputs;
a propagate cell coupled to one or more of the logic elements that are non-complementary and operable to generate one or more conditional carryout signals, without using inverters, in a single stage based on one or more of the binary results and a carry-in signal, the propagate cell configured to:
yield a carryout output of zero if the generate-bar output is one and the kill output is one;
yield a carryout output of one if the generate-bar output is one, the kill output is zero, and the carry-in signal is one without inverting the carry-in signal input to the propagate cell;
yield a carryout output of zero if the generate-bar output is one and the kill output is zero, and the carry-in signal is zero without inverting the carry-in signal input to the propagate cell; and
yield a carryout output of one if the generate-bar output is zero and the kill output is zero; and
a multiplexer operable to generate a sum that is based on a carryout signal that is based on one or more of the conditional carryout signals, and to communicate the sum to an adders circuit, a plurality of additional propagate cells are provided in parallel processing sections that receive the conditional carryout signals.

2. The apparatus of claim 1, further comprising:
a plurality of processing sections that each include one or more of the logic elements, the logic elements being operable to generate one or more of the binary results to be communicated to the additional propagate cells, each of the additional propagate cells being coupled to the multiplexer and operable to communicate additional carryout signals to the multiplexer.

3. The apparatus of claim 1, further comprising:
a microprocessor that includes the logic elements, the propagate cell, and the multiplexer.

4. A method for processing data comprising:
generating one or more binary results based on one or more inputs at a plurality of logic elements by:
generating, by a NAND gate of the logic elements, a generate-bar output from the inputs; and
generating, by a NOR gate of the logic elements, a kill output from the inputs;
generating, by a propagate cell, one or more conditional carryout signals, without using inverters, in a single stage based on one or more of the binary results and a carry-in signal, the propagate cell coupled to one or more of the logic elements that are non-complementary, the generating the conditional carryout signals comprising:
yielding a carryout output of zero if the generate-bar output is one and the kill output is one;
yielding a carryout output of one if the generate-bar output is one, the kill output is zero, and the carry-in signal is one without inverting the carry-in signal input to the propagate cell;
yielding a carryout output of zero if the generate-bar output is one and the kill output is zero, and the carry-in signal is zero without inverting the carry-in signal input to the propagate cell; and
yielding a carryout output of one if the generate-bar output is zero and the kill output is zero;
generating one or more carryout signals that are based on one or more of the conditional carryout signals;
generating, by a multiplexer, a sum based on the carryout signals; and
communicating the sum to an adder circuit, and whereby a plurality of additional propagate cells are provided in parallel processing sections that receive the conditional carryout signals.

5. The method of claim 4, further comprising:
receiving multiple inputs at a plurality of processing sections that each include one or more of the logic elements; and
generating additional binary results based on the multiple inputs, the binary results being communicated to one or more of the propagate cells.

6. A system for processing data comprising:
means for generating one or more binary results based on one or more inputs at a plurality of logic elements by:
generating, by a NAND gate of the logic elements, a generate-bar output from the inputs; and
generating, by a NOR gate of the logic elements, a kill output from the inputs;
means for generating, by a propagate cell, one or more conditional carryout signals, without using inverters, based on one or more of the binary results and a carry-in signal, the propagate cell coupled to one or more of the logic elements that are non-complementary, the generating the conditional carryout signals comprising:
yielding a carryout output of zero if the generate-bar output is one and the kill output is one;
yielding a carryout output of one if the generate-bar output is one, the kill output is zero, and the carry-in signal is one without inverting the carry-in signal input to the propagate cell;
yielding a carryout output of zero if the generate-bar output is one and the kill output is zero, and the carry-in signal is zero without inverting the carry-in signal input to the propagate cell; and yielding a carryout output of one if the generate-bar output is zero and the kill output is zero;

means for generating one or more carryout signals that are based on the conditional carryout signals;

means for generating, by a multiplexer, a sum based on the carryout signals; and communicating the sum to an adder circuit, and whereby a plurality of additional propagate cells are provided in parallel processing sections that receive the conditional carryout signals.

7. The system of claim 6, further comprising:

means for receiving multiple inputs at a plurality of processing sections; and means for generating additional binary results based on the multiple inputs, the additional binary results being implemented by one or more propagate cells.

8. A computer readable storage medium having code for processing data and configured to interface with the code operable to:

generate one or more binary results based on one or more inputs at a plurality of logic elements by:

generating, by a NAND gate of the logic elements, a generate-bar output from the inputs; and generating, by a NOR gate of the logic elements, a kill output from the inputs;

generate, by a propagate cell, one or more conditional carryout signals, without using inverters, in a single stage based on one or more of the binary results and a carry-in signal, the propagate cell coupled to one or more of the logic elements that are non-complementary, the generating the conditional carryout signals comprising:

yielding a carryout output of zero if the generate-bar output is one and the kill output is one;

yielding a carryout output of one if the generate-bar output is one, the kill output is zero, and the carry-in signal is one without inverting the carry-in signal input to the propagate cell;

yielding a carryout output of zero if the generate-bar output is one and the kill output is zero, and the carry-in signal is zero without inverting the carry-in signal input to the propagate cell; and yielding a carryout output of one if the generate-bar output is zero and the kill output is zero;

generate one or more carryout signals that are based on the conditional carryout signals;

generate, by a multiplexer, a sum based on one or more of the carryout signals; and communicate the sum to an adder circuit, and whereby a plurality of additional propagate cells are provided in parallel processing sections that receive the conditional carryout signals.

9. The medium of claim 8, wherein the code is further operable to:

produce one or more selected binary results based on one or more of the inputs.

10. The medium of claim 8, wherein the code is further operable to:

receive multiple inputs at a plurality of processing sections; and generate additional binary results based on the multiple inputs, the binary results being communicated to one or more propagate cells.

* * * * *